United States Patent
Cheng et al.

(10) Patent No.: US 7,765,392 B2
(45) Date of Patent: Jul. 27, 2010

(54) METHOD AND APPARATUS FOR ESTABLISHING PROCESSOR AS CORE ROOT OF TRUST FOR MEASUREMENT

(75) Inventors: Antonio S. Cheng, Portland, OR (US); Kirk D. Brannock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1061 days.

(21) Appl. No.: 11/479,415

(22) Filed: Jun. 29, 2006

(65) Prior Publication Data

US 2008/0005574 A1    Jan. 3, 2008

(51) Int. Cl.
*H04L 9/00* (2006.01)
(52) U.S. Cl. .................. 713/2; 713/100; 713/188; 713/193; 714/10; 714/13; 714/23; 714/24; 714/35; 714/36; 714/47; 714/51; 726/16; 726/18; 726/23; 726/25; 380/2
(58) Field of Classification Search .............. 713/2
See application file for complete search history.

(56) References Cited

U.S. PATENT DOCUMENTS

| | | | |
|---|---|---|---|
| 6,138,236 A | 10/2000 | Mirov et al. | |
| 6,571,335 B1 | 5/2003 | O'Donnell et al. | |
| 6,832,311 B2 | 12/2004 | Morisawa | |
| 6,925,557 B2 * | 8/2005 | Cromer et al. | 713/2 |
| 6,938,164 B1 | 8/2005 | England et al. | |
| 6,986,042 B2 * | 1/2006 | Griffin | 713/164 |
| 6,988,250 B1 * | 1/2006 | Proudler et al. | 716/1 |
| 7,318,150 B2 * | 1/2008 | Zimmer et al. | 713/2 |
| 7,484,099 B2 * | 1/2009 | Bade et al. | 713/176 |
| 7,533,274 B2 * | 5/2009 | Freeman et al. | 713/189 |
| 2002/0023212 A1 * | 2/2002 | Proudler | 713/164 |
| 2002/0026576 A1 * | 2/2002 | Das-Purkayastha et al. | 713/156 |
| 2003/0037231 A1 * | 2/2003 | Goodman et al. | 713/2 |
| 2005/0268079 A1 | 12/2005 | Rothman et al. | |
| 2006/0010326 A1 * | 1/2006 | Bade et al. | 713/176 |
| 2006/0075223 A1 * | 4/2006 | Bade et al. | 713/162 |
| 2006/0212939 A1 * | 9/2006 | England et al. | 726/22 |

OTHER PUBLICATIONS

Smith, S., et al, 'Building a High-Performance, Programmable Secure Coprocessor', IBM Research Division, Rev. Feb. 17, 1998, entire document, ftp://www6.software.ibm.com/software/cryptocards/rc21102.pdf.*

USPTO, "First Office Action", U.S. Appl. No. 11/479,167, Mailed Sep. 11, 2009, whole document.

* cited by examiner

*Primary Examiner*—Edan Orgad
*Assistant Examiner*—Ronald Baum
(74) *Attorney, Agent, or Firm*—Blakely, Sokoloff, Taylor & Zafman LLP

(57) ABSTRACT

A programmable processor calculates a hash value of a memory region, then monitors program operation to detect a security monitoring system initialization. The hash value is added to extend a security measurement sequence if the security monitoring system initialization clears a security state. Processors that implement similar methods, and systems using such processors, are also described and claimed.

15 Claims, 5 Drawing Sheets

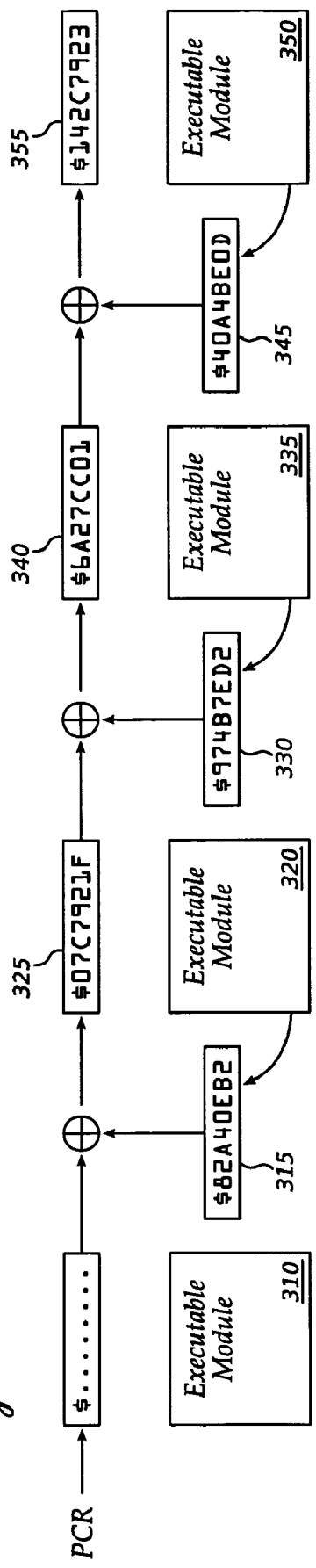
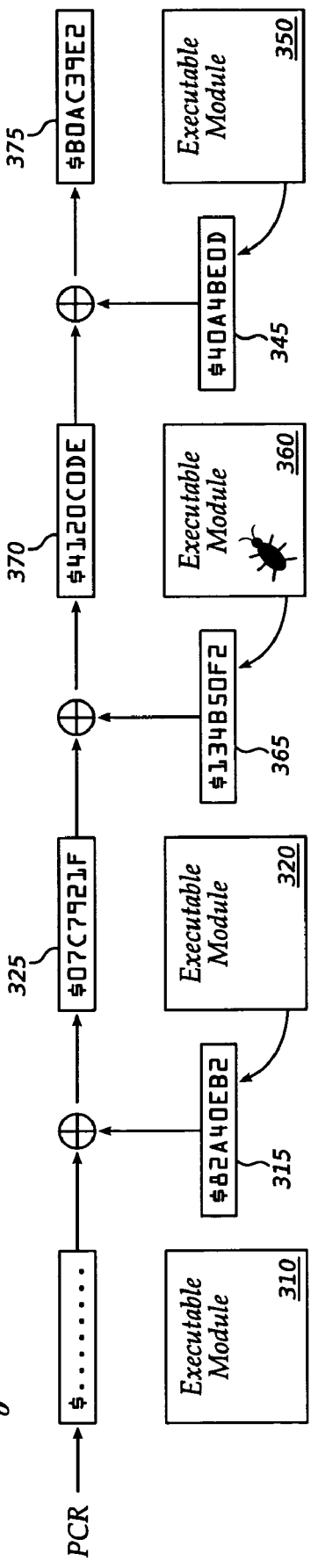
Fig. 3A
Fig. 3B

METHOD AND APPARATUS FOR ESTABLISHING PROCESSOR AS CORE ROOT OF TRUST FOR MEASUREMENT

FIELD

The invention relates to trusted computing. More specifically, the invention relates to methods for tracking the identity and order of execution of instruction sequences executed by a data processing system.

BACKGROUND

Many computer systems process sensitive, confidential and/or valuable information such as medical or financial records, proprietary business data, and licensed multimedia content. The software that runs on these systems is often subject to attack by parties who wish to obtain greater access to the information than they would ordinarily be permitted. In other circumstances, the object of a software attack is simply to obtain greater control over the system hardware itself. An example of the latter situation is a general-purpose computer that is restricted to executing software licensed by the manufacturer (this often occurs in the context of game consoles). The manufacturer may sell such a system at a loss, intending to recover the lost revenue through the sale of game software. However, customers may purchase the machine and subvert the restrictions to get a capable, general purpose computer at an attractive price.

Current methods of controlling acceptable uses of information in a system and/or acceptable uses of the system itself include cryptographic verification of software executing on the machine. Programs may be checked and verified before execution to ensure that the user has not tampered with them, and one verified program can verify and then transfer control to another program, thus extending a chain of trust or establishing a "trust boundary." Unfortunately, current systems are unable to establish a chain of trust that encompasses every instruction executed by the system. Instead, software that executes early in the system boot process (often a Basic Input/Output System, or "BIOS," stored in a read-only memory) is implicitly trusted, and serves as a root of trust for subsequent programs. However, BIOS instructions may be subverted relatively easily (for example, "mod chips" are available to remove software restrictions from game consoles). Other attacks may also target similar implicitly-trusted software modules.

One security scheme currently in use is described in the *TCG Specification Architecture Overview* (revision 1.2, published April 2004 by the Trusted Computing Group, Incorporated). This specification (and related technical documents) describe security threat models, platform support features and anticipated usage scenarios for an enterprise-wide computer system security implementation. This architecture provides a specific, concrete example of a chain-of-trust security system, including the implicitly trusted elements (known as Trusted Building Blocks or "TBBs") that form the roots or beginnings of the security chains.

New approaches to software verification may permit the establishment of stronger trust chains and place more system functionality within a trust boundary to hinder or prevent the unauthorized use of information and/or system resources.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 3A and 3B illustrate how a security measurement system can detect executable module tampering.

DETAILED DESCRIPTION

Figure 1:
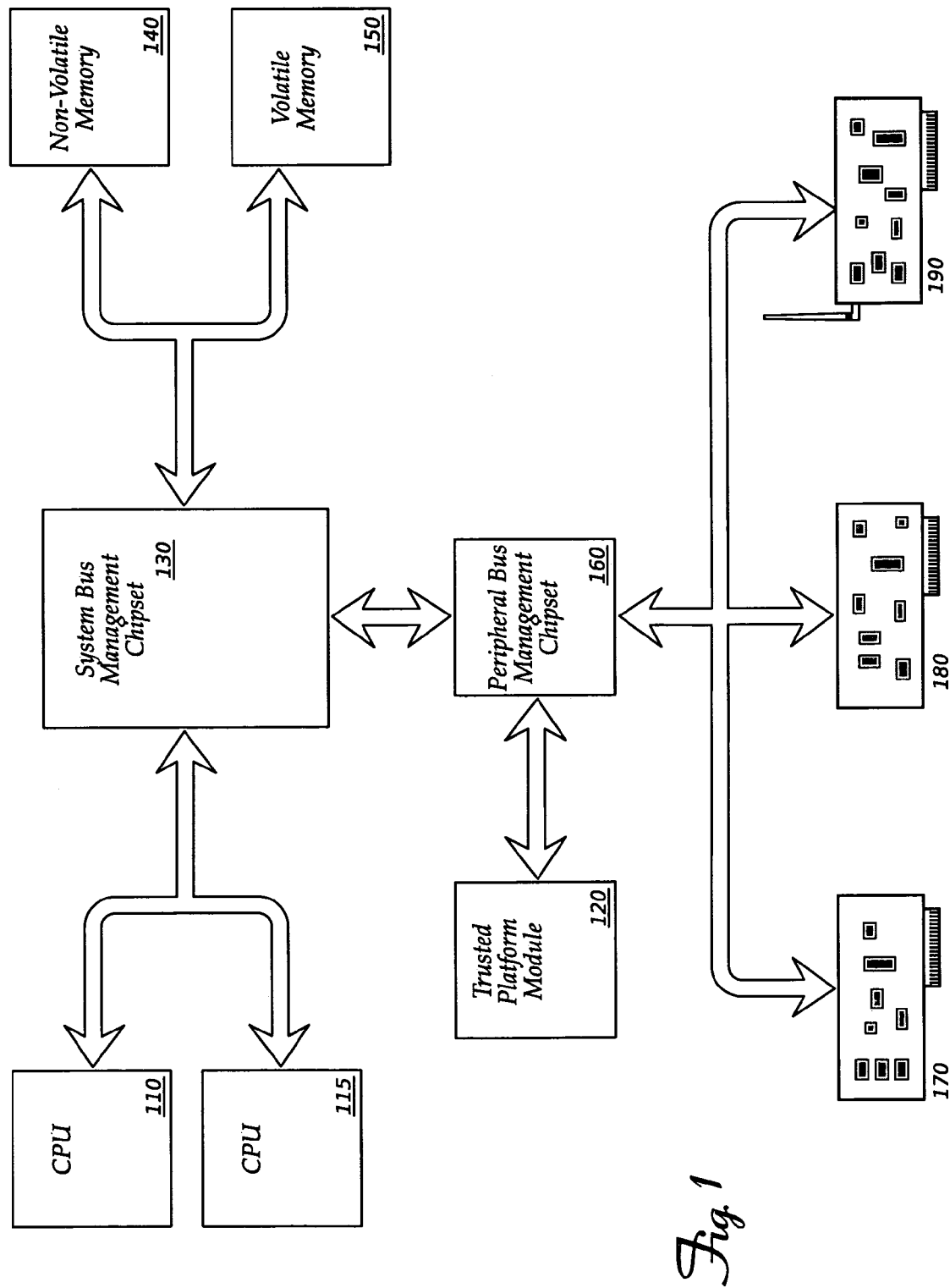
FIG. 1 shows a basic block diagram of a multiprocessor system that implements an embodiment of the invention.

Embodiments of the invention alter the normal reset sequence of a programmable processor to include computing a cryptographic hash or digest of the first user code module to be executed, before the processor begins executing the code. If the user code initializes a security auditing system, the processor automatically incorporates the previously-computed cryptographic hash into the auditing system.

In this specification, "user code" and "user instructions" refer to instructions for the programmable processor that are not hard-coded or otherwise fixed in the processor. For example, the Pentium® line of microprocessors produced by the Intel Corporation of Santa Clara, Calif. begin running after a reset by loading and executing an instruction located at memory address $FFFFFFF0. This instruction is usually stored in a read-only memory ("ROM") or other non-volatile memory (e.g. Flash memory) and is part of the basic input-output system ("BIOS"); in other contexts, it may be considered a "system" instruction. However, it is the first instruction that can be specified by a user of the microprocessor, and for the purposes of embodiments of the present invention, is the first user instruction. Note that some microprocessors (often known as "microcontrollers") include internal configurable and/or programmable memory where a software developer can store instructions, so the first user instruction may not be stored in a memory that is physically separated from the processor.

User instructions are different from another type of instruction that is only used within the processor itself. An example of the other type of instruction is called a "micro instruction" or a "microcode instruction." This type of instruction may be design-specific to each processor, and does not necessarily adhere to any architectural particular software instruction set. Microcode instructions are used to perform housekeeping tasks of the processor (for example, reset initialization processing). A sequence of microcode instructions may also be used to implement a complex user instruction. However, microcode instructions are frequently undocumented, and are not available for direct use by a programmer. The key difference between user instructions and microcode instructions (or more generally, "non-user instructions") is that user instructions permit users of the processor to direct its activities, while non-user instructions are only available for use by the processor manufacturer.

There is one wrinkle to this distinction that must be noted. Some processors provide a mechanism for user instructions to load new, different or supplemental microcode. This mechanism might be used to correct logic errors in the processor hardware or as-shipped microcode. The mechanism is invoked by executing particular system-control user instructions, and the new microcode may change the way the processor behaves. However, supplemental microcode is generally lost after a processor reset or power cycle, so the manufacturer's original microcode runs when the processor is rebooted. In any event, a user instruction is required to initiate the microcode update, and embodiments of the invention operate before the first user instruction is executed, so any loading of supplemental microcode happens only after logic implementing a portion of an embodiment has had the opportunity to carry out its functions.

FIG. 1 shows a representative data processing system configuration where an embodiment of the invention can be deployed. Elements 110 and 115 are programmable processors, or central processing units ("CPUs"). Embodiments may be used with uniprocessor and multiprocessor systems. Communication between CPUs 110, 115 and other system components such as non-volatile memory 140, volatile memory 150, and peripheral devices 170, 180 and 190 may be mediated by bus management chipsets such as system bus management chipset 130 and peripheral bus management chipset 160. Trusted platform module ("TPM") 120 is a logical subsystem that may be implemented as a separate physical device, as shown here, or integrated within another chipset (such as system bus management chipset 130 or peripheral bus management chipset 160). TPM 120 includes a number of platform configuration registers ("PCRs", not shown in this figure) that can contain cryptographic hash values. The only way to change a PCR (other than by a reset of the system or of the TPM) is through an "extend" operation, which combines the existing PCR value with a new value to produce an extended cryptographic hash value. Some methods of extending PCR values are described in the *TCG Specification Architecture Overview* mentioned above, and detailed in the *TPM Main Part* 1 *Design Principles* specification (version 1.2, revision 94, published March 2006).

Figure 2:
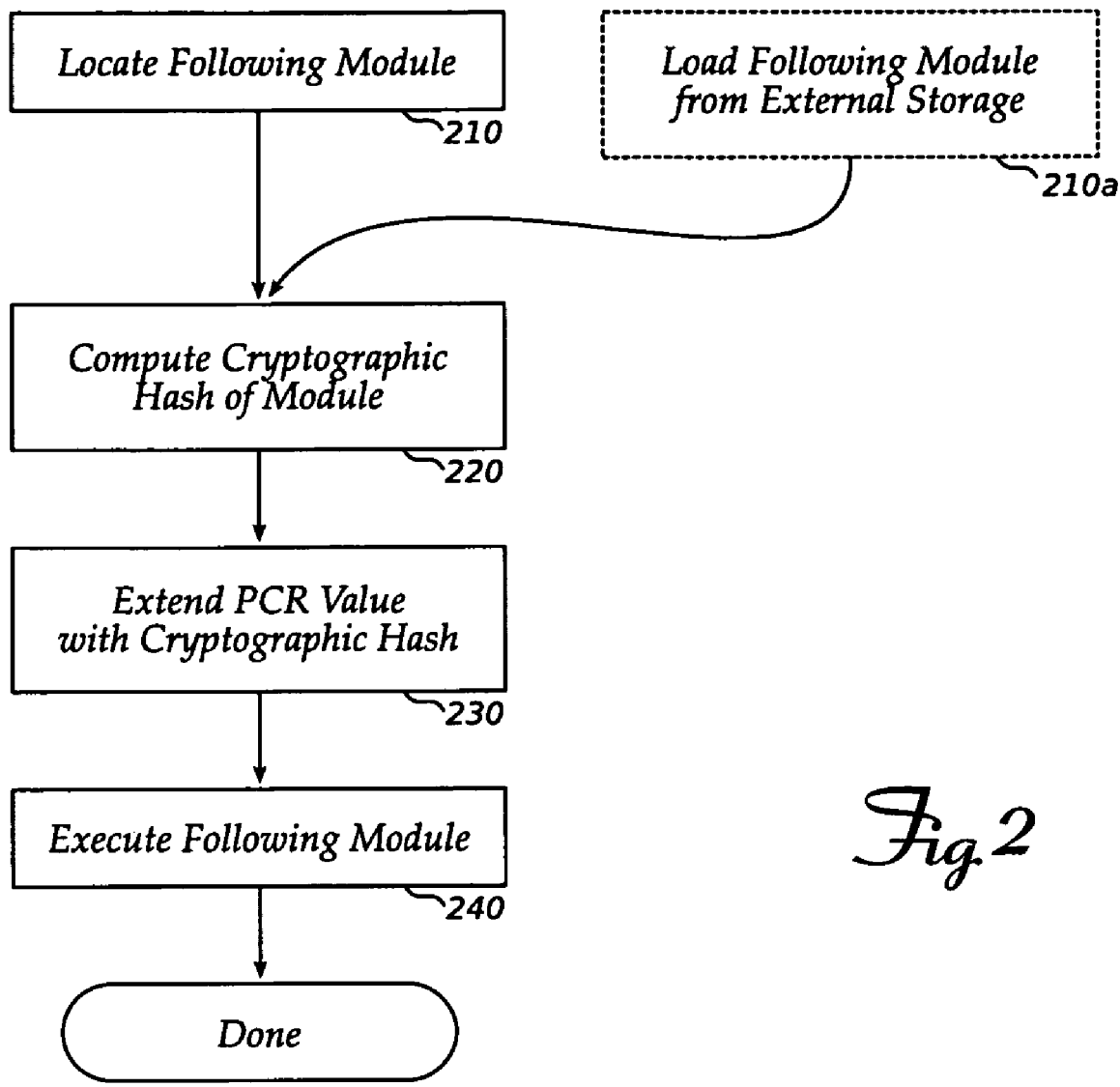
FIG. 2 outlines operations of an embodiment.

PCR extension methods are designed to be irreversible and the result is unique: if the cryptographic algorithms are unbroken, the chance for finding an input that, when incorporated into a PCR, causes the PCR value to become a chosen target value, is no greater than a pure random chance. Platform security schemes can be built around this property as shown in FIG. 2. When a first executable module (e.g. a program or a subroutine) is to transfer control to a second executable module, it locates the module (210) (or perhaps loads the module into memory from a mass storage device, 210a), then computes a cryptographic hash of the module (220). Next, the cryptographic hash is incorporated into a PCR value through an extend operation (230). Finally, the second executable module is executed (240). The second module (or any later-executed module) can examine the PCR value to determine whether any previous modules have been tampered with or executed out of order, or whether unexpected modules have been executed. The process of computing a hash of a module and incorporating it into a PCR is called "measuring." A second part of the security system may provide a trusted mechanism for reporting measurements (e.g. PCR values) to a central authority. Reporting is not relevant to embodiments of the invention and will not be discussed in any detail, but a complete security system requires both measurement and reporting to provide trust.

FIG. 3A shows how a PCR value may change when successive modules are measured into the TPM: module 310 computes a hash 315 for module 320 and extends the PCR value 325. Next, module 320 computes a hash 330 for module 335 and extends the PCR value 340. Finally, module 335 computes a hash 345 for module 350 and extends the PCR value 355. Module 350 can compare PCR value 355 with an expected value to determine whether all is well.

FIG. 3B shows the same sequence of measurements, but module 335 has been damaged (as indicated by the "bug" icon in the module, now identified as element 360). Consequently, module 320 will compute a different hash 365 for module 360, and the extended PCR value 370 will be different. Even if module 350 and its hash 345 are unchanged, the extended PCR value 375 will signal that an earlier module was not as expected. The reporting mechanism may use operations known as "seal" and "unseal." Software can seal a secret against one or more PCRS, and only store the sealed version of the secret. Later, the secret can only be unsealed properly if the PCR value is identical to the time when it was sealed.

This system works well, but can be subverted by attacking the first module in the chain. This is typically the first user code to execute after a system reset (or after "waking up" following a dormant "sleep" period). This code is frequently stored in a non-volatile memory such as a read-only memory ("ROM"), an [electrically] eraseable, programmable, read-only memory ("[E]EPROM"), or a Flash memory, and is often referred to as the basic input-output system or "BIOS." Attacks exploiting this weakness have been seen in real-world systems.

Figure 4:
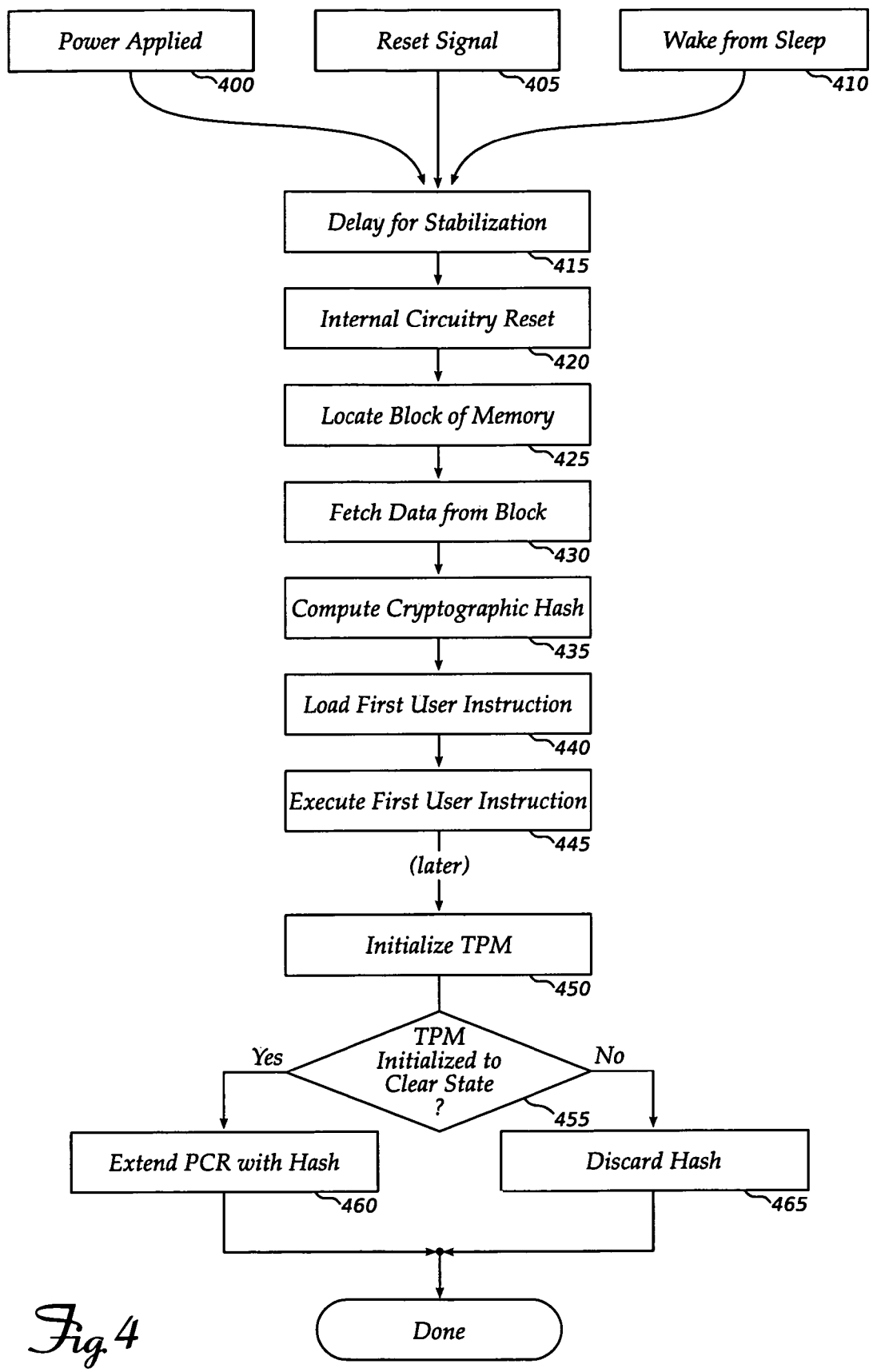
FIG. 4 is a detailed flow chart explaining operations of an embodiment of the invention.

An embodiment of the invention tightens the security of the TPM system and thwarts many attacks by operating as shown in FIG. 4. A programmable processor (microprocessor, central processing unit or "CPU") commences operation after power is applied (400), after a reset signal (405), or after recovering from a sleep state (410). There may be a time delay (415) while voltages and/or clocks stabilize, and internal circuitry may be reset (420). Some reset- or wake-up-related functions may be governed by hard-wired circuitry, while other operations may be performed by microcode instructions built into the CPU and executed automatically during a reset sequence. The reset process may clear a set of processor registers (a "register file"), a memory cache subsystem, a virtual memory management subsystem, an arithmetic logic unit ("ALU"), and/or other processor subsystems.

At this point, a prior-art microprocessor might retrieve a first user instruction located at a predetermined address in memory (or alternatively, retrieve a pointer or "vector" at a predetermined address, and then load the first user instruction from the pointed-to address) and execute the instruction. However, according to an embodiment of the invention, the processor locates a block of memory (425) including its address and length, then fetches data from the block (430) and computes a cryptographic hash of the data (435). The hash may be computed according to a Secure Hash Algorithm ("SHA"), a Message Digest ("MD") algorithm, or other suitable cryptographically secure, one-way hash algorithm supported by the TPM. Operations 425, 430 and 435 are performed without retrieving and/or executing any user instructions from a user memory. In many embodiments, these operations are performed under the control of microcode instructions (or state machines) built into the processor itself, although dedicated hardware circuits may be provided to iteratively load the bytes of data in the block of memory and compute the cryptographic hash.

After the hash is computed, the processor begins executing user instructions by loading the first user instruction at a predetermined address in memory (440) and executing it (445). Execution of user instructions continues in the ordinary manner.

Later, a user instruction may initialize a Trusted Platform Module ("TPM") in the system (450). An embodiment of the invention detects the initialization and, if the initialization was to put the TPM in a clear state (455), a platform configuration register ("PCR") is extended with the previously-computed hash (460). (In other words, the previously-computed hash is measured into the PCR.) If the user instruction initializes the TPM to a non-clear state (as might occur if the system was recovering from a sleep period and the TPM was to be initialized to its pre-sleep condition), the hash of the boot block may be discarded (465).

Figure 5:
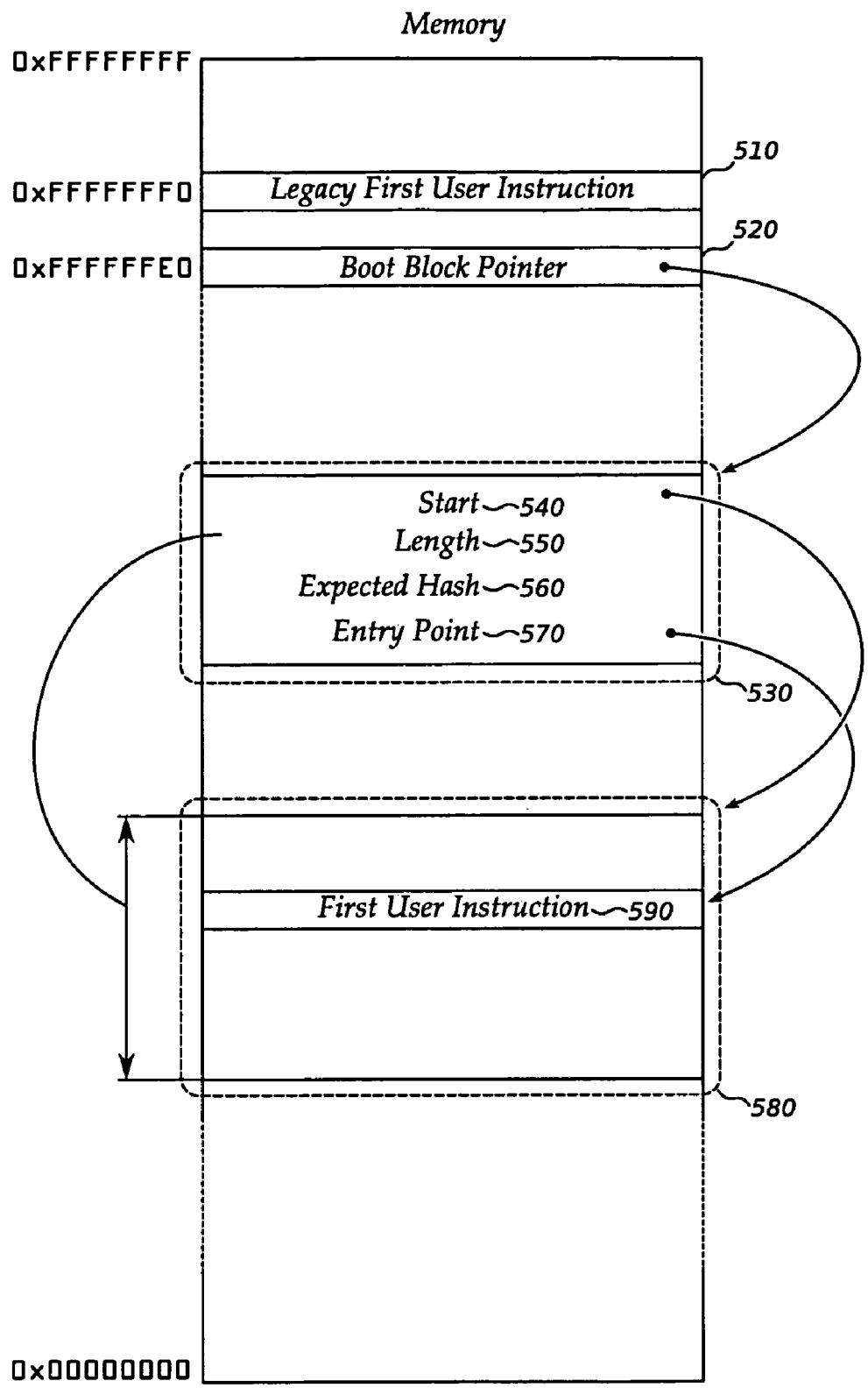
FIG. 5 shows how data structures relevant to an embodiment of the invention may be arranged in a memory of a programmable processor.

The block of memory located and hashed as described above may be a "boot block," as shown in FIG. 5. A programmable processor according to an embodiment of the invention may load a data structure 530 from a predetermined address, or alternatively, load a pointer 520 from a predetermined address, and then load the data structure 530 from the memory to which the pointer points. The data structure may contain information such as a start address 540 of a block of memory 580, a length 550 of the block of memory, an expected hash or checksum 560 of the block of memory, and a start address 570 located within the block. The processor may fetch bytes from the block identified in the data structure and compute a cryptographic hash of those bytes, then fetch the first user instruction 590 from memory at the start address 540 and execute it. Later, as described with reference to FIG. 4, if user code initializes a Trusted Platform Module, the processor can extend a PCR with the previously-calculated hash. In a system without a TPM, or where the user code does not initialize (or, presumably, use) the TPM, no TPM initialization will be detected and the processor will simply have wasted a small amount of time computing the hash before commencing ordinary instruction execution. Therefore, a processor implementing an embodiment of the invention is backwards-compatible with legacy systems. Note that the boot block discussed above need not have the exact structure described. Other fields may contain additional information, and the order of fields may be different. The structure of the boot block will be the result of design decisions made by the processor's design engineers.

An embodiment of the invention may be a machine-readable medium having stored thereon instructions which cause a programmable processor to perform operations as described above. In other embodiments, the operations might be performed by specific hardware components that contain hard-wired logic. Those operations might alternatively be performed by any combination of programmed computer components and custom hardware components.

In one embodiment, the machine-readable medium is a non-transitory machine-readable medium that may include any mechanism for storing information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that a security scheme that moves the root of a trust chain into a programmable processor can also be constructed with software and hardware that distribute the functions of embodiments of this invention differently than herein described. Such variations and implementations are understood to be captured according to the following claims.

We claim:

1. A method comprising:
    initializing a processor via a reset signal, a system power-up, or the processor wake-up from a sleep state;
    calculating a cryptographic hash value of a data from a block of memory in response to the initializing;
    loading a first user instruction in response to calculating the cryptographic hash value of the data, the first user instruction located at a predetermined address in memory;
    executing the first user instruction by the processor;
    detecting an initialization of a security monitoring system in response to the executing the first user instruction, the security monitoring system having a platform configuration register (PCR) with a value; and
    extending the PCR with the cryptographic hash value by adding the cryptographic hash value to the PCR value to generate an extended cryptographic hash value, the extending of the PCR is performed if the security monitoring system initialization clears a security state else the cryptographic hash is discarded.

2. The method of claim 1, wherein the block of memory is identified in a basic input-output system ("BIOS") boot block.

3. The method of claim 1, wherein the calculating operation occurs after the processor initialization and before any user instruction is executed.

4. The method of claim 1, wherein the first user instruction is configurable by a user.

5. The method of claim 1, wherein calculating the cryptographic hash value comprises:
    computing a digest according to a hash algorithm supported by the security monitoring system.

6. The method of claim 5, wherein the hash algorithm is one of a Secure Hash Algorithm ("SHA") or a Message Digest ("MD") algorithm.

7. The method of claim 1, wherein the security monitoring system is a trusted platform module ("TPM").

8. A system comprising:
    a processor;
    a reset circuit to reset the processor;
    a user memory physically separated from the processor; and
    a security measurement system, wherein the processor is operable to perform a method, the method comprising:
    initializing the processor via the reset circuit;
    calculating a cryptographic hash value of a data from the user memory in response to the initializing;
    loading a first user instruction in response to calculating the cryptographic hash value of the data, the first user instruction located at a predetermined address in the user memory;
    executing the first user instruction by the processor;
    detecting an initialization of the security monitoring system in response to the executing the first user instruction, the security monitoring system having a platform configuration register (PCR) with a value; and
    extending the PCR with the cryptographic hash value by adding the cryptographic hash value to the PCR value to generate an extended cryptographic hash value, the extending of the PCR is performed if the initialization of the security monitoring system clears a security state else the cryptographic hash is discarded.

9. The system of claim 8, wherein the user memory is identified in a basic input-output system ("BIOS") boot block.

10. The system of claim 8, wherein the security measurement system complies with a trusted platform module ("TPM") architecture.

11. A machine-readable non-transitory medium containing instructions to cause a programmable processor to perform operations comprising: initializing the programmable processor via a reset signal, a system power-up, or the processor wake-up from a sleep state; calculating a cryptographic hash value of a data from a block of memory in response to the initializing; loading a first user instruction in response to calculating the cryptographic hash value of the data, the first user instruction located at a predetermined address in memory; executing the first user instruction by the processor; detecting an initialization of a security monitoring system in response to the executing the first user instruction, the security monitoring system having a platform configuration register (PCR) with a value; and extending the PCR with the cryptographic hash value by adding the cryptographic hash value to the PCR value to generate an extended cryptographic hash value, the extending of the PCR is performed if the security monitoring system initialization clears a security state else the cryptographic hash is discarded.

12. The machine-readable non-transitory medium of claim 11, wherein the calculating operation occurs after the processor initialization and before any user instruction is executed.

13. The machine-readable non-transitory medium of claim 11, wherein calculating the cryptographic hash value comprises: computing a digest according to a hash algorithm supported by the security monitoring system, and wherein the machine-readable non-transitory medium containing additional instructions to cause the programmable processor to perform operations comprising: commencing a boot sequence after computing the digest.

14. The machine-readable non-transitory medium of claim 13, wherein initializing the programmable processor comprises at least one of: initializing a register file; initializing a cache memory; and initializing a virtual memory management system.

15. The machine-readable non-transitory medium of claim 11, wherein the security measurement system complies with a trusted platform module ("TPM") architecture.

* * * * *